Aug. 19, 1952 R. M. PATTERSON 2,607,403
CIRCUMFERENTIALLY TRAVELING TYPE PEDESTAL
MOUNTED TIRE REMOVING DEVICE
Filed July 18, 1947 3 Sheets-Sheet 1
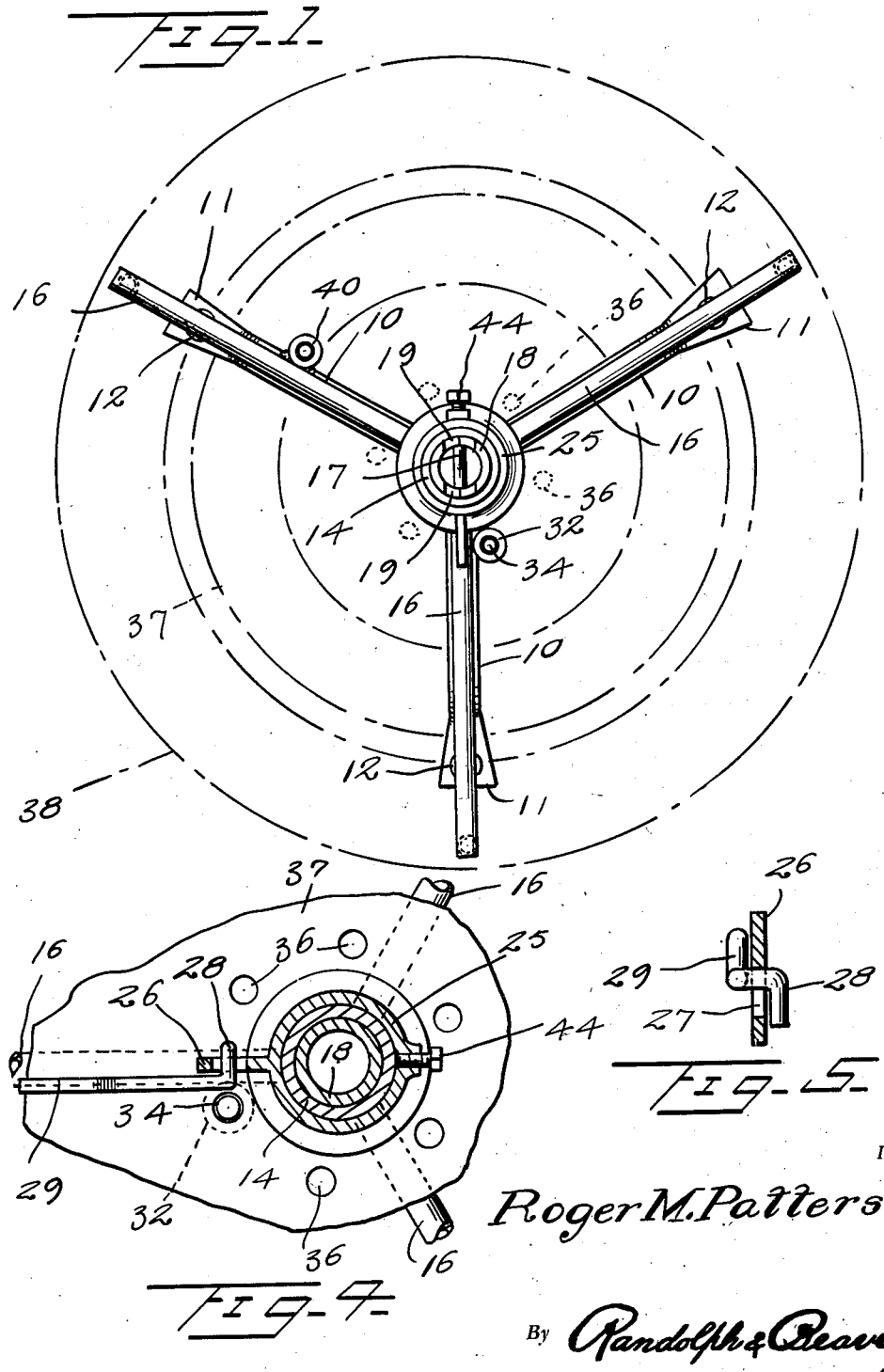
Inventor
Roger M. Patterson
By Randolph & Beavers
Attorneys

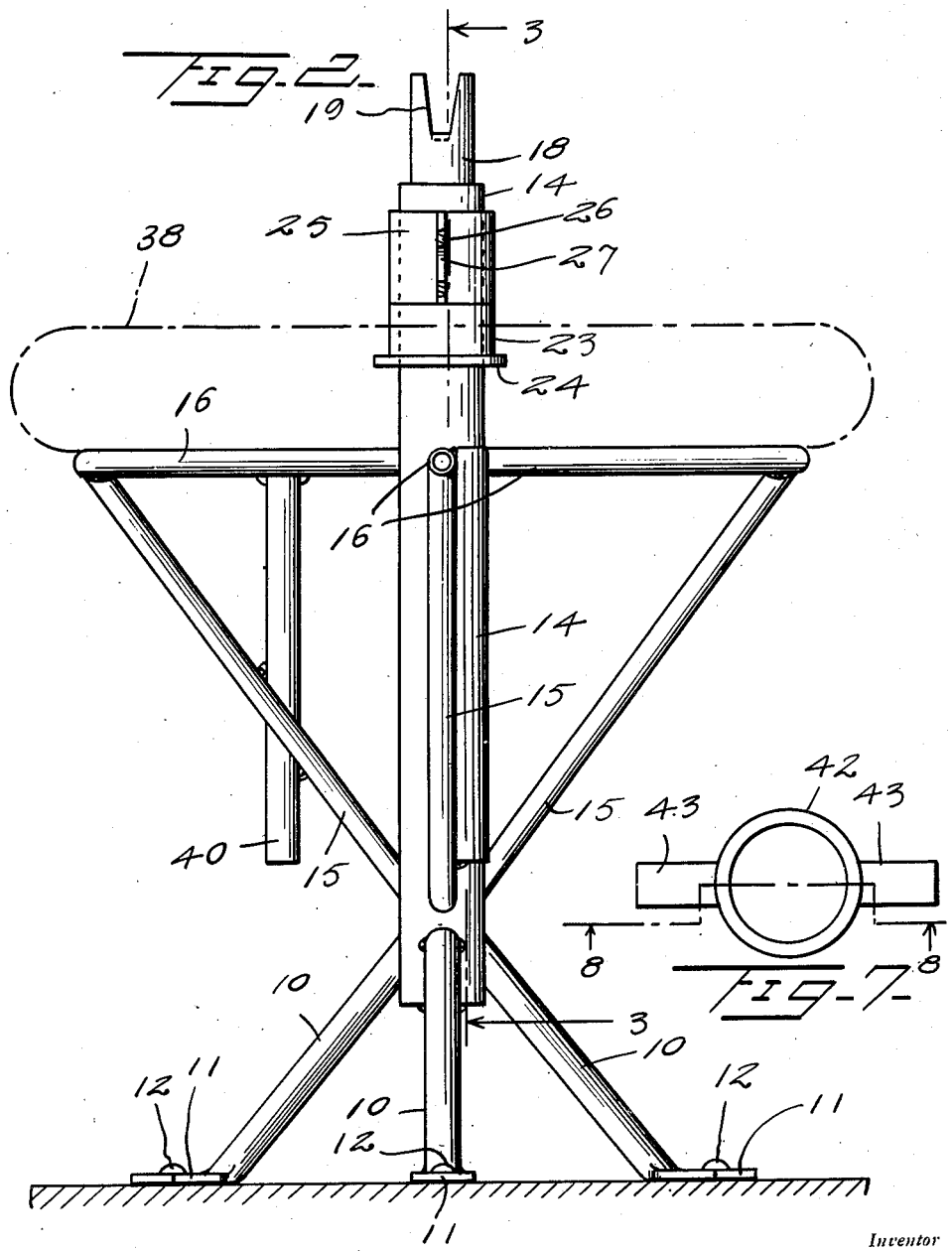
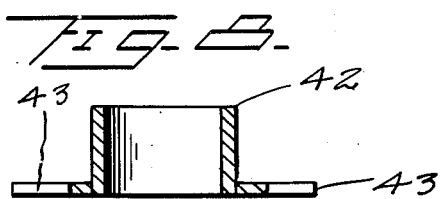

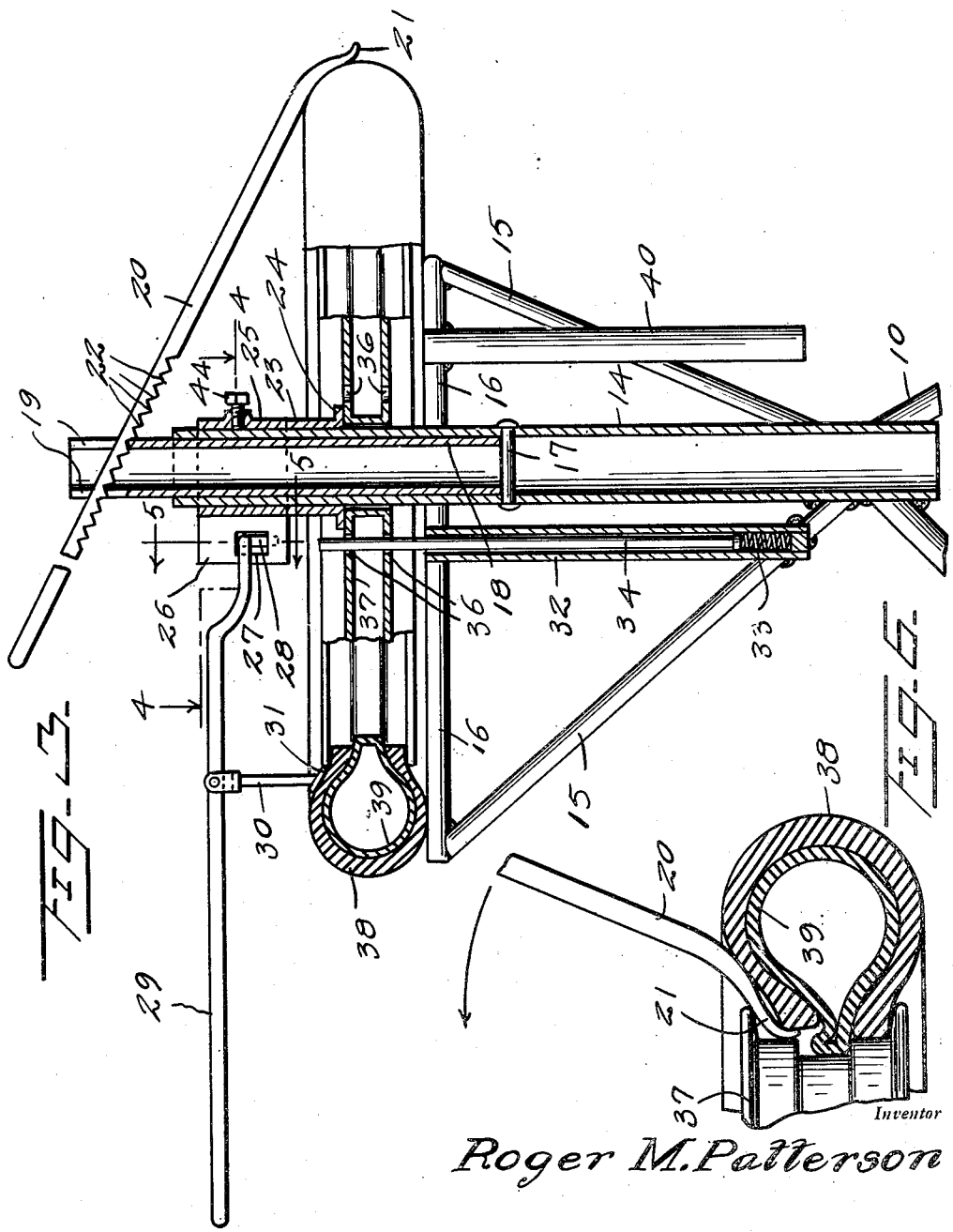

Patented Aug. 19, 1952

2,607,403

UNITED STATES PATENT OFFICE 2,607,403

CIRCUMFERENTIALLY TRAVELING TYPE PEDESTAL MOUNTED TIRE REMOVING DEVICE

Roger M. Patterson, Eufaula, Okla.

Application July 18, 1947, Serial No. 761,855

2 Claims. (Cl. 157—1.24)

The present invention relates to a tire changer and it consists in the combinations, constructions and arrangements of parts herein described and claimed.

It is an object of the invention to provide a tire changer which will be economical to manufacture, sturdy in construction and efficient in use.

Another object of the invention is the provision of a tire changer having simple means for removing a tire bead from a wheel and simple means for spreading the same for the removal of a tube therefrom.

Another object of the invention is the provision of a tire changer which will enable an operator to change a tire in a minimum of time.

A further object of the invention is the provision of a tire changer having a minimum number of attachments all of simple construction.

A still further object of the invention is the provision of a tire changer having means for locking thereon wheels of all conventional sizes and constructions.

Another object of the invention is the provision of a tire changer having novel means for applying a lever to the bead of a tire.

Other and further objects of the invention will become apparent from a reading of the following specification taken in conjunction with the drawings, in which:

Figure 1 is a plan view of an embodiment of the invention,

Figure 2 is an elevational view of the same,

Figure 3 is a sectional view taken along line 3—3 of Figure 2,

Figure 4 is a sectional view taken along line 4—4 of Figure 3,

Figure 5 is a sectional view taken along line 5—5 of Figure 3,

Figure 6 is a fragmentary elevational view, partly broken away, showing certain details of the invention, Figure 7 is a plan view of an element of the invention, and Figure 8 is a sectional view taken along line 8—8 of Figure 7.

Generally, there is provided a tire changer having a tripod base and a centrally disposed cylindrical body interconnected with the legs of the tripod with horizontally extending arms adapted to support a wheel and tire. A cylindrical support is revolubly mounted in the body member and is provided with a notched upper end adapted to act as a fulcrum for a lever designed to engage the bead of a tire. The underside of the lever is provided with a series of notches adapted to engage with the notched upper end of the support. A collar having an annular flange at its lower end is adapted to surround the cylindrical body in revoluble relation thereto and is provided with a locking bolt to hold the same in selected positions. The collar is also provided with an integrally formed dog to which is pivotally and removably mounted a lever provided with a pendant arm having a bead engaging foot thereon. Affixed to the tire supporting arm and to the tripod is a pair of pipe-like members having closed lower ends and adapted to receive a rod extending through one of the bolt lug openings of the wheel. The pipes are disposed at different distances from the cylindrical body. A secondary collar is provided for use when certain types of wheels are to be supported by the apparatus.

Referring more particularly to the drawings, there is shown therein a tire changer having three angularly disposed legs 10 arranged in the form of a tripod having their lower ends formed into feet 11 for reception of floor bolts 12 or the like and having their upper ends attached adjacent the lower end of a vertically extending hollow cylindrical body member 14. Three arms 15 are affixed to the cylindrical member 14 and extend outwardly and upwardly and thence inwardly in a horizontal direction to form tire supporting arms 16, their inner ends being affixed to the body 14.

A bolt 17 is transversely mounted in the body 14 immediately below the juncture of the arms 16 therewith.

A cylindrical support 18 is adapted to be revolubly disposed in the body 14 and rest upon the bolt 17 and have its upper end protrude from the body. The upper end of the support 18 is provided with a pair of diametrically opposed notches 19. A tire removing lever 20 is provided and has a bead-engaging hook 21 at one end and a series of notches 22 adjacent its other end.

A collar 23 having a flange 24 at its lower end is slidably mounted on the outer side of the body 14. A hollow cylindrical hub 25 is adapted to be revolubly mounted on the outer side of the body 14 and rest upon the upper edge of the collar 23 and is provided with an outwardly extending dog 26 having an opening 28 for the reception of an L-shaped inner end 28 of a bead pressing lever to which is pivotally mounted a downwardly extending arm 30 having a bead-engaging foot 31 at its lower extremity.

A vertically extending housing 32 of elongated cylindrical construction is affixed at its upper end to an arm 16 and at its lower end to an arm 15. A spring 33 is mounted in the bottom of the rod housing and is adapted to yieldably support a rod 34 which, in turn is adapted to extend upwardly through bolt lug receiving openings 36 in a wheel 37 having a tire 38 and an inner tube 39 mounted thereon in conventional manner.

A like rod housing 40 is mounted in identical manner but at a greater radial distance from the body 14.

A secondary collar 42 is interchangeable with the collar 23 and is provided with a pair of outwardly extending arms 43. The hub 25 is provided with a locking bolt 44 which is adapted to bear against the body 14.

In operation, it will be seen that a wheel with a tire to be worked upon is placed upon the supporting arms 16 and that the collar 23 is then placed over the body 14, the flange 24 resting upon the wheel 37. Thereupon, the hub 25 is placed over the body 14 in such manner as to rest upon the upper end of the collar 23 and the lock bolt 44 tightened. The L-shaped end 28 of the lever 29 is inserted into the opening 29 in the dog 26 and the foot 31 placed against the bead of the tire 38 and the lever is then pressed downwardly, thereby causing pressure to be applied to the bead to loosen the same from the tire 37. This action may take place throughout the entire circumference of the tire due to the fact that the hub 25 is revoluble upon the body 14. While it is necessary to loosen the bolt 44 each time the hub 25 is moved to a new position, it is usually only necessary to cause but one downward movement of the foot 31 to break the tire bead loose from the rim.

The bead-engaging hook 21 of the lever 20 is then inserted between the bead of the tire and the wheel in the manner shown in Figure 6 and the lever moved in the direction of the arrow in that figure or toward the center of the wheel. The notches 22 may then be engaged with the notches 19 and, since the support 18 is revoluble within the body 14, the lever and its bead-engaging end may then be moved throughout the entire circumference of the wheel, thereby to loosen the bead from the wheel. The operation may be repeated, if it is desired to remove the tire entirely from the wheel by applying the same tactics to the remaining bead. To merely remove the inner tube 39, however, the upper bead is all that it is necessary to disengage from the wheel.

To hold the wheel against revoluble movement, the rod 34 is inserted in the rod housing 32 or 40, as the type of wheel may direct, the upper end of the rod protruding through openings 36 in the wheel 37.

To secure better purchase for the operation of lever 29, the bolt 44 may be threadably moved into engagement with the body 14 to lock the hub temporarily thereto.

The rod 34 will, of course, be inserted into one or the other of the housings 32 or 40, depending upon the type of wheel and the springs 33 will act as shock-absorbers, thus allowing for greater wear and less noise in this particular operation.

In the case of certain now obsolescent wheels, it is necessary to substitute the collar 42 for the collar 23 in order that the arms 43 may be enabled to secure the wheel in such case.

While but one form of the invention has been shown and described herein, it will be readily apparent to those skilled in the art that many minor modifications may be made without departing from the spirit of the invention or the scope of the appended claims.

What is claimed is:

1. A tire changer comprising a hollow cylindrical body, supporting legs for said body, wheel and tire supporting arms affixed to said body, a bolt transversely mounted in said body, a cylindrical support revolubly mounted in the body upon said bolt and having a notched upper end, a tire-removing lever having a series of serrations along one side adapted to lock with said notch, and means for locking a wheel against rotary movement upon said wheel and tire supporting arms, said last mentioned means comprising a vertically extending rod housing having an open upper end adapted to receive a rod extended through one of the conventional lug bolt openings of a tire.

2. A tire changer comprising a hollow cylindrical body, supporting legs for said body, wheel and tire supporting arms affixed to said body, a bolt transversely mounted in said body, a cylindrical support revolubly mounted in the body upon said bolt and having a notched upper end, a tire-removing lever having a series of serrations along one side adapted to lock with said notch, and means for locking a wheel against rotary movement upon said wheel and tire supporting arms said last mentioned means comprising vertically extending rod housings mounted at different radial distances from the housing and each having an open upper end adapted to receive a rod extended through one of the conventional lug bolt openings of a tire and having a spring buffer for the rod in the lower end thereof.

ROGER M. PATTERSON.

REFERENCES CITED

The following references are of record in the file of this patent:

UNITED STATES PATENTS

| Number | Name | Date |
|---|---|---|
| 1,208,184 | Mayer | Dec. 12, 1916 |
| 1,298,820 | Strobeck | Apr. 1, 1919 |
| 1,316,390 | Rischard | Sept. 16, 1919 |
| 1,742,590 | Freivogel | Jan. 7, 1930 |
| 1,809,169 | Kennedy | June 9, 1931 |
| 2,000,036 | Renfro | May 7, 1935 |
| 2,034,819 | Maulis | Mar. 24, 1936 |
| 2,043,169 | Hawkinson | June 2, 1936 |
| 2,201,982 | Bazarek | May 28, 1940 |
| 2,418,849 | Polt | Apr. 15, 1947 |
| 2,471,642 | Moltz | May 31, 1949 |